(12) United States Patent
Valencia

(10) Patent No.: US 11,918,103 B2
(45) Date of Patent: Mar. 5, 2024

(54) FULL-MOUTH MANUAL TOOTHBRUSH

(71) Applicant: Jose Luis Valencia, Lodi, CA (US)

(72) Inventor: Jose Luis Valencia, Lodi, CA (US)

( * ) Notice: Subject to any disclaimer, the term of this patent is extended or adjusted under 35 U.S.C. 154(b) by 0 days.

(21) Appl. No.: 17/745,640

(22) Filed: May 16, 2022

(65) Prior Publication Data

US 2022/0361659 A1 Nov. 17, 2022

Related U.S. Application Data

(60) Provisional application No. 63/188,740, filed on May 14, 2021.

(51) Int. Cl.
*A46B 9/04* (2006.01)
*A46B 7/04* (2006.01)
*A46B 7/06* (2006.01)
*A46B 15/00* (2006.01)
*A61C 15/04* (2006.01)

(52) U.S. Cl.
CPC .............. *A46B 9/045* (2013.01); *A46B 7/04* (2013.01); *A46B 7/06* (2013.01); *A46B 15/0061* (2013.01); *A46B 15/0069* (2013.01); *A46B 15/0081* (2013.01); *A61C 15/043* (2013.01); *A46B 2200/1066* (2013.01)

(58) Field of Classification Search
None
See application file for complete search history.

(56) References Cited

U.S. PATENT DOCUMENTS

| | | | | |
|---|---|---|---|---|
| 1,369,664 A * | 2/1921 | Izawa | ...................... | A46B 7/06 15/167.1 |
| 1,709,262 A * | 4/1929 | Henderhan | ............ | A46B 9/045 15/167.2 |
| 5,956,797 A | 9/1999 | Wilson | | |
| 6,138,689 A * | 10/2000 | Stern | .................... | A46B 5/0016 132/309 |
| 6,625,834 B2 * | 9/2003 | Dean | .................... | A46B 5/0012 15/23 |

(Continued)

FOREIGN PATENT DOCUMENTS

| | | |
|---|---|---|
| CN | 2666253 Y | 12/2004 |
| CN | 201986937 U | 9/2011 |

OTHER PUBLICATIONS

HydraBrush Multi-Head Power Toothbrush Hydra Brush, Retrieved from Internet, Retrieved on Apr. 6, 2021 <URL: https://www.activeforever.com/hydrabrush-multi-head-power-toothbrush-hydra-brush>.

*Primary Examiner* — Bryan R Muller
*Assistant Examiner* — Dana Lee Poon

(57) ABSTRACT

The present invention is a full-mouth toothbrush apparatus. The full-mouth toothbrush apparatus comprises a housing, a pair of brush tines, a set of brush connectors, and a set of brush inserts. The set of brush connectors comprises a pair of first brush connectors and a second brush connector. The pair of brush tines is terminally connected adjacent to the housing. The set of brush connectors is distributed about the pair of brush tines. The pair of first brush connectors is terminally distributed along the pair of brush tines. The pair of first brush connectors is hingedly connected along the pair of brush tines. The second brush connector is slidably connected along the pair of brush tines. The second brush connector is positioned between the housing and the first pair of first brush connectors.

12 Claims, 6 Drawing Sheets

(56) References Cited

U.S. PATENT DOCUMENTS

| | | | |
|---|---|---|---|
| 2004/0187887 A1* | 9/2004 | Beckman | A46B 15/0055 |
| | | | 132/309 |
| 2008/0216257 A1* | 9/2008 | Ahadpour | A46B 7/04 |
| | | | 15/22.1 |
| 2009/0235474 A1* | 9/2009 | Seigel | A46B 15/0081 |
| | | | 15/167.1 |
| 2013/0000658 A1* | 1/2013 | Nguyen | A61C 15/043 |
| | | | 132/200 |
| 2021/0106130 A1* | 4/2021 | Forbes | A46B 5/0004 |
| 2022/0022638 A1* | 1/2022 | Su | A46B 15/0081 |

\* cited by examiner

FULL-MOUTH MANUAL TOOTHBRUSH

FIELD OF THE INVENTION

The present invention relates to toothbrushes. More specifically, the present invention is a full-mouth toothbrush.

BACKGROUND OF THE INVENTION

When it comes to daily chores and repetitive activity, the activity of brushing teeth is well-known by everyone. Brushing teeth is typically done in the morning after waking up and in the evening when heading to sleep. The small design of standard toothbrushes can be troublesome when it comes to brushing teeth a set of teeth. More specifically, there are occasions where people are in a rush and brushing teeth may be a hassle due to the small design of a standard toothbrush. Standard toothbrushes can only speed up the process of brushing teeth by so much due to the small surface area that the brush covers. In addition, when in a rush, the effectiveness of brushing teeth with a standard toothbrush may be inefficient due to rushing the process of thoroughly brushing teeth.

An objective of the present invention is to provide device that quickly and efficiently brushes teeth. The present invention is a full-mouth toothbrush that is able to brush and clean a wide range of surface area for a set of teeth. The present invention also provides a storage unit for housing dental floss. In addition, the present invention provides a device that assist with the usage of dental floss. Furthermore, the present invention provides a tongue scraper to clean the tongue.

SUMMARY OF THE INVENTION

The present invention is a full-mouth toothbrush apparatus. The full-mouth toothbrush apparatus comprises a housing, a pair of brush tines, a set of brush connectors, and a set of brush inserts. The set of brush connectors comprises a pair of first brush connectors and a second brush connector. The pair of brush tines is terminally connected adjacent to the housing. The set of brush connectors is distributed about the pair of brush tines. The pair of first brush connectors is terminally distributed along the pair of brush tines. The pair of first brush connectors is hingedly connected along the pair of brush tines. The second brush connector is slidably connected along the pair of brush tines. The second brush connector is positioned between the housing and the first pair of first brush connectors.

DETAIL DESCRIPTIONS OF THE INVENTION

Figure 1:
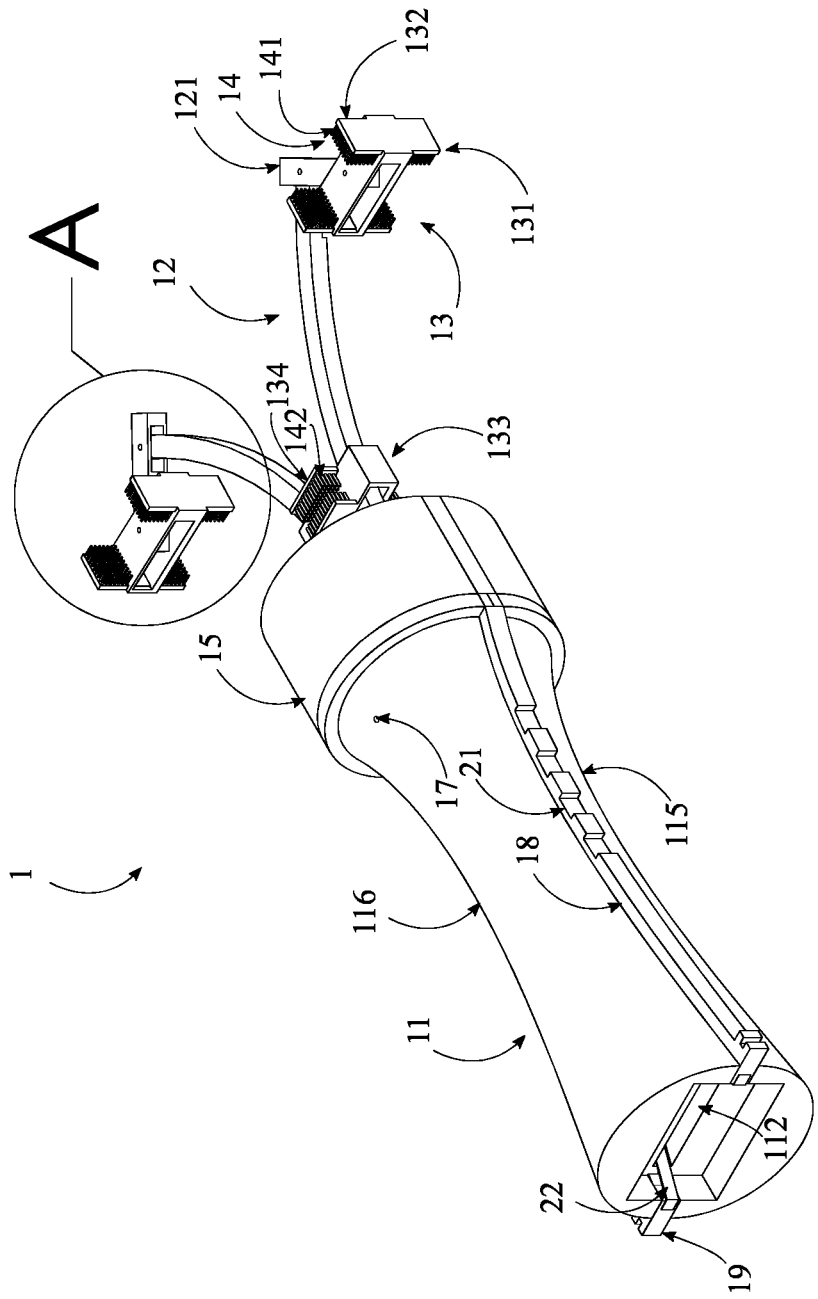
FIG. 1 is a top perspective view of the present invention in accordance with a retracted configuration.
Figure 2:
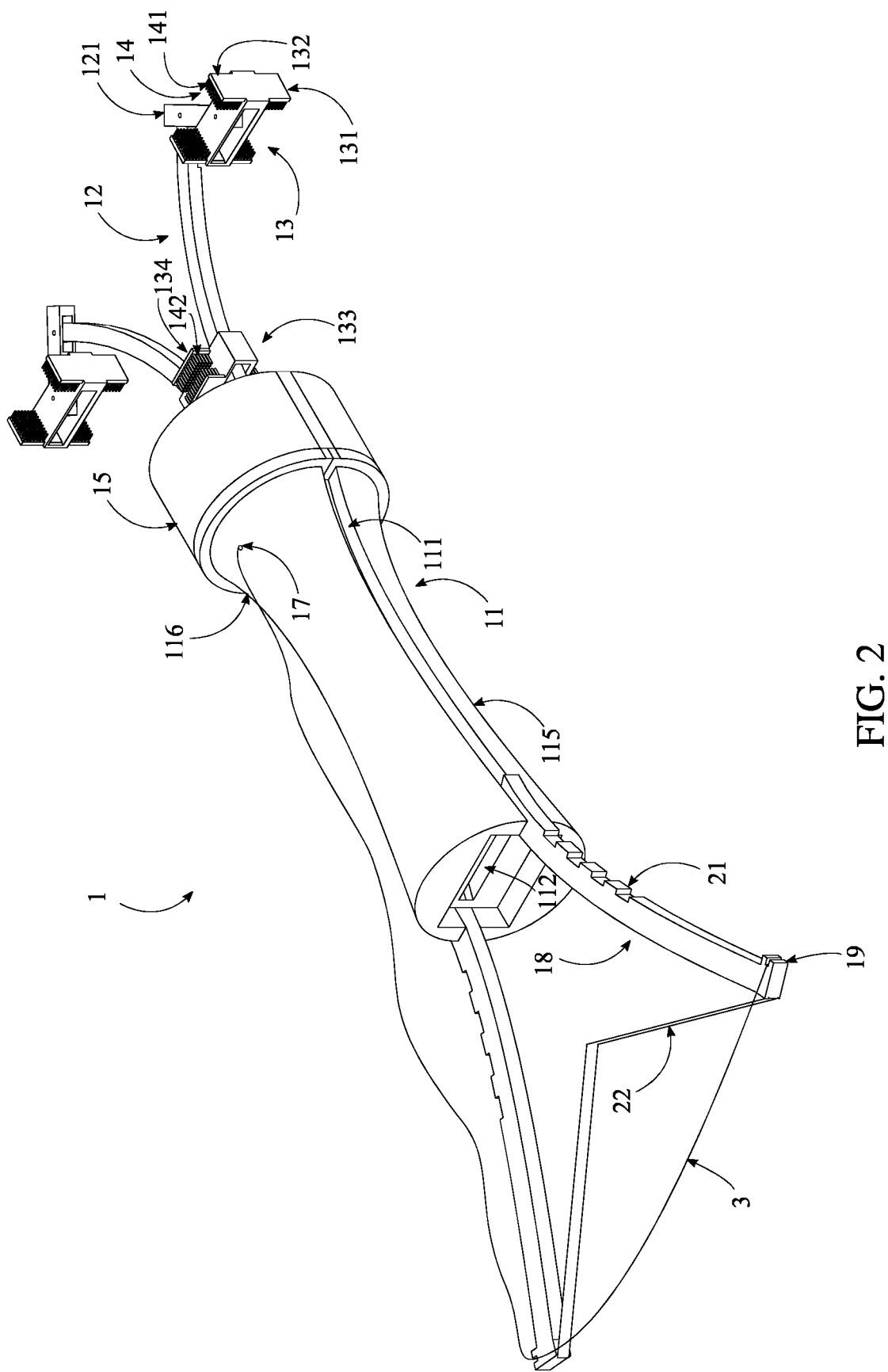
FIG. 2 is a bottom perspective view of the present invention in accordance with a deployed configuration with a floss string element tied and taut along a pair of accessory tines.
Figure 3:
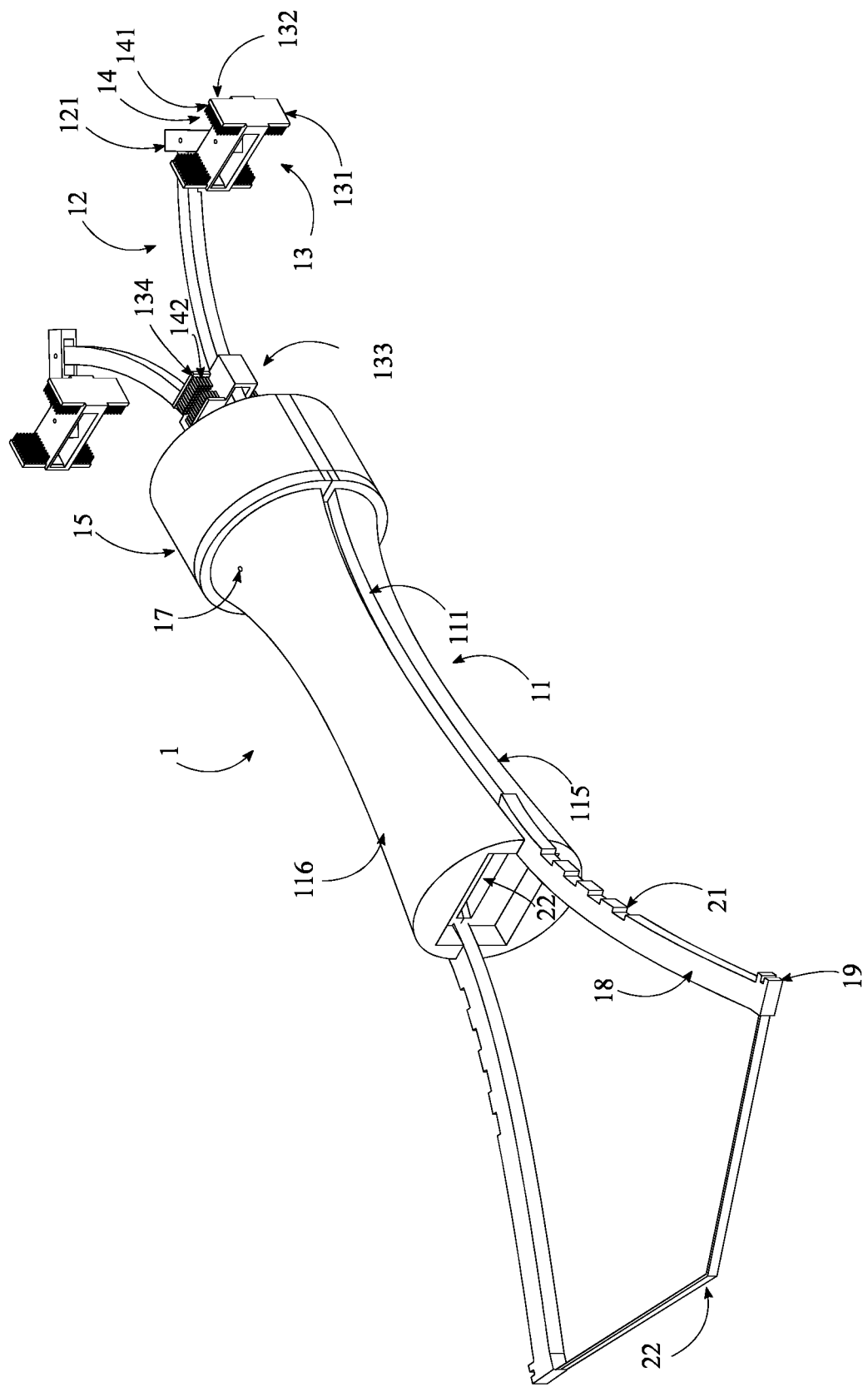
FIG. 3 is a bottom perspective view of the present invention in accordance with the deployed configuration with a tongue scraper unit deployed along the pair of accessory tines.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-4, the present invention is a full-mouth toothbrush apparatus 1. In reference to FIGS. 1-4, the full-mouth toothbrush apparatus comprises a housing, a pair of brush tines 12, a set of brush connectors 13, and a set of brush inserts 14. The set of brush connectors 13 comprises a pair of first brush connectors 131 and a second brush connector 133. The pair of brush tines 12 is terminally connected adjacent to the housing 11. The set of brush connectors 13 is distributed about the pair of brush tines 12. The pair of first brush connectors 131 is terminally distributed along the pair of brush tines 12. The pair of first brush connectors 131 is hingedly connected along the pair of brush tines 12. The second brush connector 133 is slidably connected along the pair of brush tines 12. The second brush connector 133 is positioned between the housing 11 and the first pair of first brush connectors 131. In the preferred embodiment, the full-mouth toothbrush serves as a complete all-in-one dental care device that provides full brushing to the user's dental teeth profile. In the preferred embodiment, the full-mouth toothbrush apparatus 1 is made out of any suitable material, such as, but not limited to polymer, stainless steel, or any other suitable material. In the preferred embodiment, the housing 11 takes the form of any suitable chassis suitable for securing and holding the components that constitutes the full-mouth toothbrush apparatus 1. In the preferred embodiment, the housing 11 takes the form of an hourglass shaped profile but may take the form of any other suitable ergonomic shape for handling.

In the preferred embodiment, the pair of brush tines 12 takes the form of a pair of toothbrush prongs that diverge from one another such that the pair of brush tines 12 is scaled and shaped to fit comfortably along the user's dental teeth profile. More specifically, the pair of brush tines 12 serves as the primary toothbrush body that connects along the handle, where the pair of brush tines 12 is configured to position and secure the set of brush connectors 13. In the preferred embodiment, the set of brush connectors 13 takes the form of movable connectors hingedly connected or slidably connected along the pair of brush tines 12. In the preferred embodiment, the set of brush connectors 13 serves as mounting implements for the set of brush inserts 14. In the preferred embodiment, the set of brush inserts 14 takes the form of replaceable toothbrush bristles. In the preferred embodiment, the pair of first brush connectors 131 takes the form of terminally and hingedly connected brush connectors along the pair of brush tines 12, where the pair of first brush connectors 131 covers the user's rear-teeth and molar dental profile of brushing. In the preferred embodiment, the second brush connector 133 takes the form of a centrally positioned and slidably connected brush connector that covers the user's front teeth profile, working in conjunction with the pair of first brush connectors 131 to cover the user's entire dental teeth profile.

Figure 4:
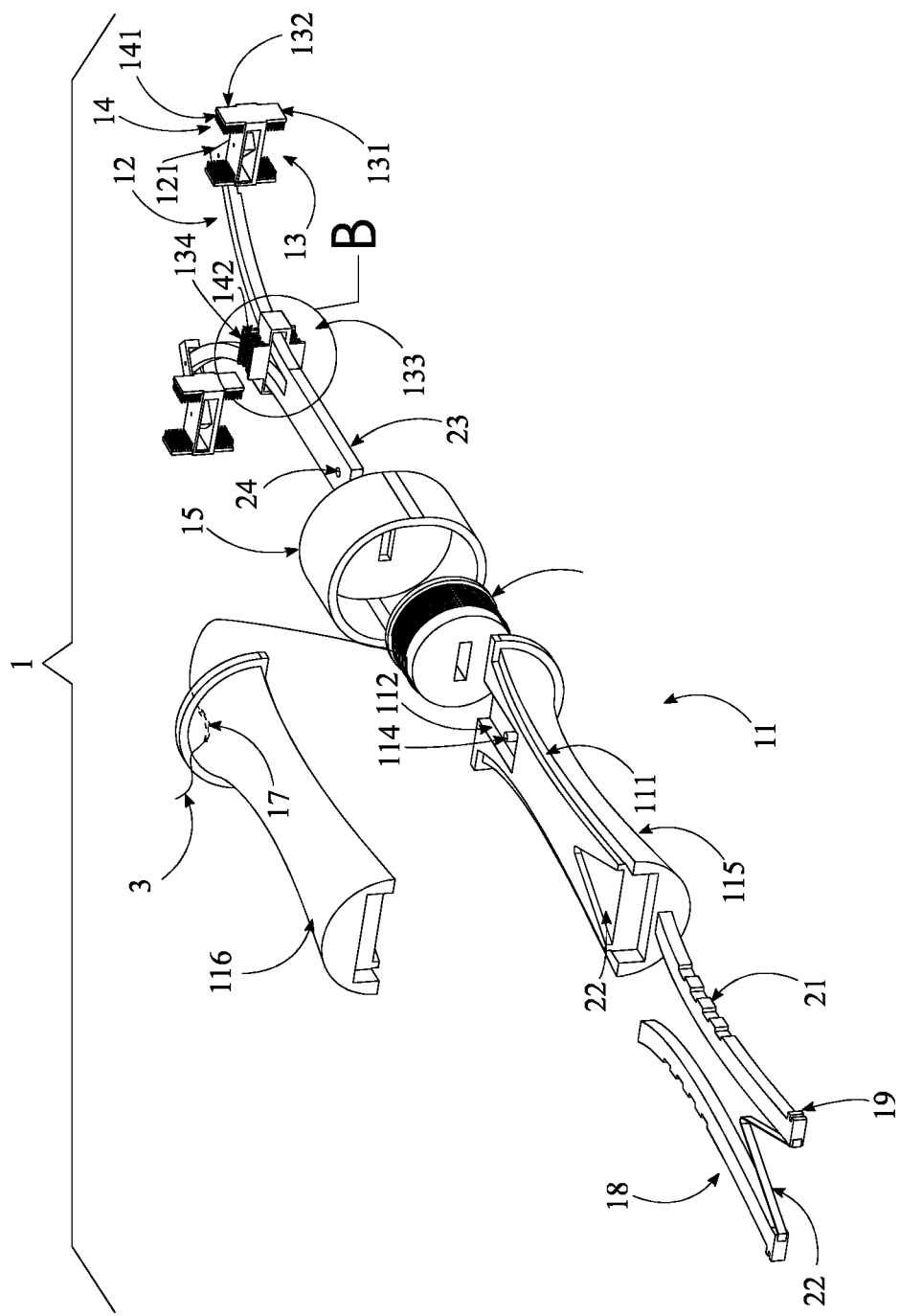
FIG. 4 is an exploded view of the present invention.

The full-mouth toothbrush apparatus 1 further comprises a floss storage unit 15, a floss spool insert 16 and a floss channel 17, as shown in FIG. 4. The floss storage unit 15 is connected between the housing 11 and the pair of brush tines 12. The floss spool insert 16 is positioned within the floss storage unit 15. The floss channel 17 traversing through the housing 11, where the floss channel 17 is configured to pass floss string element 3 dispensed from the floss spool insert 16 through the housing 11. The floss storage unit 15 stores and mounts the floss spool insert 16 along the housing 11. In the preferred embodiment, the floss spool insert 16 takes the form of a spool that holds and dispenses a floss string element 3. In the preferred embodiment, the floss channel 17 takes the form of a dispensing channel that allows the floss string element 3 from the spool to feed and pass through the housing 11.

The full-mouth toothbrush apparatus 1 further comprises a pair of accessory tines, as shown in FIGS. 1-4. The housing 11 comprises a pair of accessory tine channels. The pair of accessory tine channels 111 traversing along the housing 11. The pair of accessory tines 18 is slidably connected along the plurality of accessory tine channels, where the pair of accessory tines 18 is configured to slide along the pair of accessory tine channels 111 in a retracted configuration or a deployed configuration. In the preferred embodiment, the pair of accessory tines 18 takes the form of retractable tines that serves as a flosser fork or as a body for a tongue scraper. In the preferred embodiment, the pair of accessory tine channels 111 takes the form of mounting channels that supports and secures the pair of accessory tines 18 such that the pair of accessory tine channels 111 is configured to slidably connect and mount the pair of accessory tines 18 along the housing 11 in the retracted configuration or the deployed configuration, shown in FIGS. 1-3.

In reference to FIGS. 1-4, the pair of accessory tines 18 comprises a pair of floss receiving tips 19. The pair of floss receiving tips 19 is terminally connected adjacent to the pair of accessory tines 18, opposite to the pair of brush tines 12. The pair of accessory tines further comprises a grasping element 21. The grasping element 21 is connected along the pair of accessory tines 18. In the preferred embodiment, the pair of floss receiving tips 19 serves as terminally connected floss cord connectors along the pair of accessory tines 18, where the pair of floss receiving tips 19 is configured to mount the floss string element 3 such that the floss string element 3 tauts and forms a flossing fork along the pair of accessory tines 18. In the preferred embodiment, the grasping element 21 takes the form of any suitable grasping implement, such as, but not limited to grasping slots, silicone coating, knurled texturing, or any other suitable grasping implement that allows the user to grasp the housing 11 along the grasping element 21. Additionally, the grasping element 21 is configured to allow the user to grasp the pair of accessory tines 18 such that the user can slide the pair of accessory tines 18 in the retracted configuration or the deployed configuration, shown in FIGS. 1-3.

In reference to FIGS. 1-4, the full-mouth toothbrush apparatus further comprises a tongue scraper unit 22. The tongue scraper unit 22 is terminally connected adjacent to the pair of accessory tines 18, opposite to the pair of brush tines 12. The housing 11 comprises a scraper receiver 112. The scraper receiver 112 traversing into the housing 11, where the scraper receiver 112 is configured to receive the tongue scraper unit 22 when the pair of accessory tines 18 is configured in the retracted configuration, shown in FIG. 1. The pair of brush tines 12 further each comprises a brush arm 121. The brush arm 121 is hingedly connected between the pair of brush tines 12 and the set of brush connectors 13. In the preferred embodiment, the tongue scraper unit 22 takes the form of any suitable tongue scraper, such as, but not limited to foldable tongue bars, or any other suitable tongue scraper that can retract or deploy along the pair of accessory tines 18. In the preferred embodiment, the scraper receiver 112 takes the form of a receiving cavity traversing into the housing 11 such that the scraper receiver 112 is stored within the receiving cavity in the retracted configuration. In the preferred embodiment, the brush arm 121 takes the form of hingedly connected extensions along the pair of brush tines 12, where the brush arm 121 is configured to extend the reach of the set of brush connectors 13 such that the set of brush connectors reaches along the user's molar or rear dental teeth profile while maintaining a full range of articulation.

The full-mouth toothbrush comprises a fastening body and a fastening aperture, as shown in FIG. 4. The housing 11 comprises fastening receiver 113, a fastening post 114, a first half 115, and a second half 116, as shown in FIG. 4. The first half 115 and the second half 116 are terminally connected adjacent to each other. The fastening receiver 113 traversing into the first half 115. The fastening post 114 is connected along the fastening receiver 113. The fastening body 23 is terminally connected adjacent to the pair of brush tines 12. The fastening aperture 24 is positioned along the fastening body 23. The fastening aperture 24 is connected along the fastening post 114. In the preferred embodiment, the fastening body 23 takes the form of any suitable fastening implement that attaches the pair of brush tines 12 to the housing 11. In the preferred embodiment, the fastening aperture 24 serves as a mounting aperture to connect along the fastening post 114. In the preferred embodiment, the fastening receiver 113 serves as a mounting cavity to attach and secure the fastening body 23 along the housing 11. In the preferred embodiment, the fastening post 114 takes the form of a mounting post that connects along the fastening aperture 24 such that the fastening body 23 is held in place along the fastening receiver 113. In the preferred embodiment, the first half 115 serves as the bodily half of the housing 11 that supports the fastening receiver 113 and the fastening post 114, while the second half 116 attaches along the first half 115 in order to secure the fastening body 23 along the fastening receiver 113.

Figure 5:
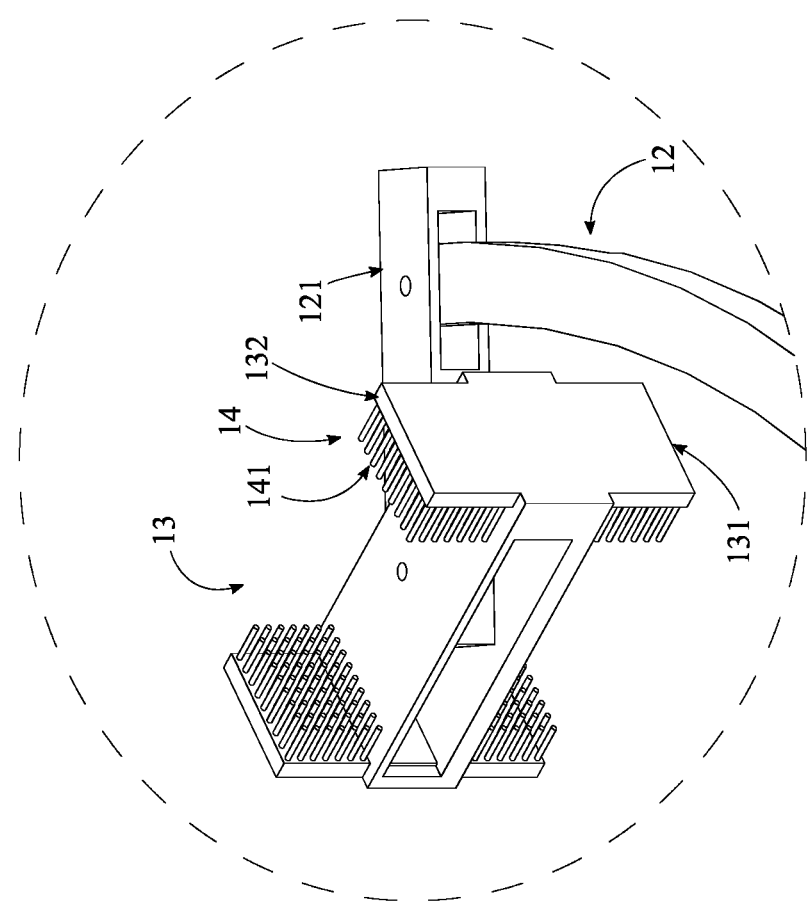
FIG. 5 is a detailed view taken along circle A in FIG. 1.
Figure 6:
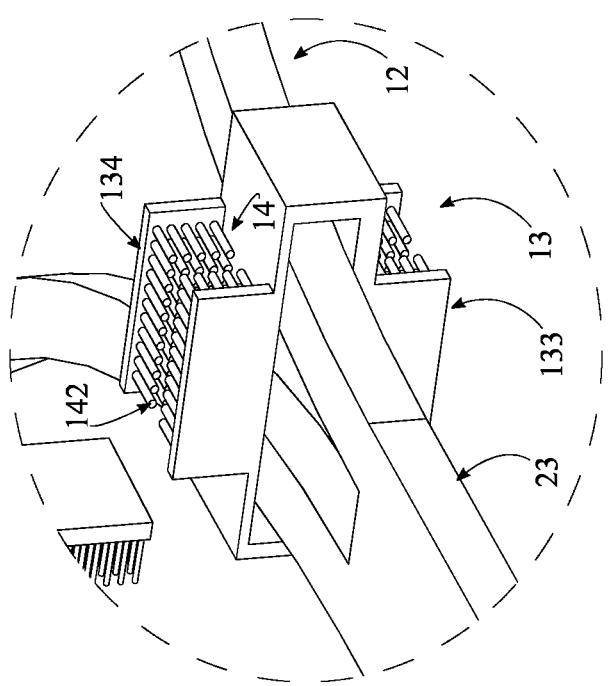
FIG. 6 is a detailed view taken along circle B in FIG. 4.

In reference to FIG. 5, the pair of first brush connectors 131 comprises a plurality of first brush connecting tabs 132. The plurality of first brush connecting tabs 132 is laterally distributed about the plurality of first brush connectors. In reference to FIG. 6, the second brush connector 133 comprises a plurality of second brush connecting tabs 134. The plurality of first brush connecting tabs 132 is longitudinally distributed about the second brush connector 133. The set of brush inserts 14 comprises a plurality of first brush inserts 141, shown in FIG. 5. The plurality of first brush inserts 141 is distributed about the plurality of first brush connectors. The set of brush inserts 14 comprises a plurality of second brush inserts 142, shown in FIG. 6. The plurality of second brush inserts 142 is distributed about the plurality of second brush connector 133s. In the preferred embodiment, the plurality of first brush connecting tabs 132 takes the form of laterally oriented vertically projected connection tabs along the pair of first brush connectors 131 that secures the plurality of first brush inserts 141 along the pair of first brush connectors 131. In the preferred embodiment, the plurality of second brush connecting tab takes the form of longitudinally oriented vertically projected connection tabs along the second brush connector 133 that secures the plurality of second brush inserts 142 along the second brush connector 133. In the preferred embodiment, the plurality of first brush inserts 141 and the plurality of second brush inserts 142 takes the form of replaceable toothbrush bristle inserts.

Although the invention has been explained in relation to its preferred embodiment, it is to be understood that many other possible modifications and variations can be made without departing from the spirit and scope of the invention as hereinafter claimed.

What is claimed is:

1. A full-mouth toothbrush apparatus comprising:
a housing;
a pair of brush tines;
a set of brush connectors;
a set of brush inserts;
the set of brush connectors comprising a pair of first brush connectors and a second brush connector;
the pair of brush tines being terminally connected adjacent to the housing;
the set of brush connectors being distributed about the pair of brush tines;
the pair of first brush connectors being terminally distributed along the pair of brush tines;
the pair of first brush connectors being hingedly connected along the pair of brush tines;
the second brush connector being slidably connected along the pair of brush tines;
the second brush connector being positioned between the housing and the first pair of first brush connectors;
the second brush connector comprising a plurality of second brush connecting tabs; and
the plurality of second brush connecting tabs being longitudinally distributed about the second brush connector.

2. The full-mouth toothbrush apparatus as claimed in claim 1 comprising:
a floss storage unit;
a floss spool insert;
a floss channel;
the floss storage unit being connected between the housing and the pair of brush tines;
the floss spool insert being positioned within the floss storage unit; and
the floss channel traversing through the housing, wherein the floss channel is configured to pass floss string dispensed from the floss spool insert through the housing.

3. The full-mouth toothbrush apparatus as claimed in claim 1 comprising:
a pair of accessory tines;
the housing comprising a pair of accessory tine channels;
the pair of accessory tine channels traversing along the housing; and
the pair of accessory tines being slidably connected along the plurality of accessory tine channels, wherein the pair of accessory tines is configured to slide along the pair of accessory tine channels in a retracted configuration or a deployed configuration.

4. The full-mouth toothbrush apparatus as claimed in claim 3 comprising:
the pair of accessory tines comprising a pair of floss receiving tips; and
the pair of floss receiving tips being terminally connected adjacent to the pair of accessory tines, opposite to the pair of brush tines.

5. The full-mouth toothbrush apparatus as claimed in claim 3 comprising:
The pair of accessory tines comprising a grasping element; and
The graphing element being connected along the pair of accessory tines.

6. The full-mouth toothbrush apparatus as claimed in claim 3 comprising:
a tongue scraper unit; and
the tongue scraper unit being terminally connected adjacent to the pair of accessory tines, opposite to the pair of brush tines.

7. The full-mouth toothbrush apparatus as claimed in claim 6 comprising:
the housing comprising a scraper receiver; and
the scraper receiver traversing into the housing, wherein the scraper receiver is configured to receive the tongue scraper unit when the pair of accessory tines is configured in the retracted configuration.

8. The full-mouth toothbrush apparatus as claimed in claim 1 comprising:
the pair of brush tines further each comprising a brush arm; and
the brush arm being hingedly connected between the pair of brush tines and the set of brush connectors.

9. The full-mouth toothbrush apparatus as claimed in claim 1 comprising:
a fastening body;
a fastening aperture;
the housing comprising fastening receiver, a fastening post, a first half, and a second half;
the first half and the second half being terminally connected adjacent to each other;
the fastening receiver traversing into the first half;
the fastening post being connected along the fastening receiver;
the fastening body being terminally connected adjacent to the pair of brush tines;
the fastening aperture being positioned along the fastening body; and
the fastening aperture being connected along the fastening post.

10. The full-mouth toothbrush apparatus as claimed in claim 1 comprising:
the pair of first brush connectors comprising a plurality of first brush connecting tabs; and
the plurality of first brush connecting tabs being laterally distributed about the plurality of first brush connectors.

11. The full-mouth toothbrush apparatus as claimed in claim 1 comprising:
the set of brush inserts comprising a plurality of first brush inserts; and
the plurality of first brush inserts being distributed about the plurality of first brush connectors.

12. The full-mouth toothbrush apparatus as claimed in claim 11 comprising:
the set of brush inserts comprising a plurality of second brush inserts; and
the plurality of second brush inserts being distributed about the plurality of second brush connectors.

* * * * *